US006897969B1

(12) United States Patent
Shimizu

(10) Patent No.: US 6,897,969 B1
(45) Date of Patent: May 24, 2005

(54) IMAGE FORMING METHOD

(75) Inventor: Osamu Shimizu, Shizuoka (JP)

(73) Assignee: Fuji Photo Film Co., LTD, Kanagawa (JP)

(*) Notice: Subject to any disclaimer, the term of this patent is extended or adjusted under 35 U.S.C. 154(b) by 647 days.

(21) Appl. No.: 09/590,010

(22) Filed: Jun. 9, 2000

(30) Foreign Application Priority Data

Jun. 10, 1999 (JP) .......................................... 11-164029

(51) Int. Cl.[7] ............................................... G06F 15/00

(52) U.S. Cl. ......................... 358/1.1; 358/1.9; 358/404; 358/444; 358/1.15

(58) Field of Search ......................... 358/1.9, 404, 444, 358/1.15, 1.16, 1.1, 462, 450; 382/251, 233

(56) References Cited

U.S. PATENT DOCUMENTS 5,774,634 A * 6/1998 Honma et al. ............... 358/1.9

FOREIGN PATENT DOCUMENTS

JP 9-1866 1/1997 ............. B41J/2/52

* cited by examiner

*Primary Examiner*—Twyler Lamb
(74) *Attorney, Agent, or Firm*—Sughrue Mion, PLLC

(57) ABSTRACT

An image forming method is provided which, even when misregistration occurs in locating of a recording position of each color, can make color misalignment inconspicuous, and hence is effective in obtaining a recorded image of a high quality. An image is recorded while, for one color, unit blocks which are adjacent to each other in the main scanning direction of image recording are provided with gradation characteristics in different matrix arrangements in which front and rear portions that are obtained by division at an intermediate position in the sub-scanning direction are replaced with each other.

15 Claims, 7 Drawing Sheets

BK

PULSE PERIOD ( us )

1200 1000 800 600 400 200 0

B0 B1 B2 B3 B4 B5 B6 B7 B8 B9 B10 B11 B12 B13 B14 B15 B16

0 512 1024

GRADATION LEVEL

BK
PULSE PERIOD ( us )
1200
1000
800
600
400
200
0
GRADATION LEVEL
0
512
1024
B0
B1
B2
B3
B4
B5
B6
B7
B8
B9
B10
B11
B12
B13
B14
B15
B16

C
PULSE PERIOD ( us )
1800
1600
1400
1200
1000
800
600
400
200
0
0
512
1024
GRADATION LEVEL
C0
C1
C2
C3
C4
C5
C6
C7
C8
C9
C10
C11
C12

| | | | |
|---|---|---|---|
| 1 | 0 | 16 | 0 |
| 0 | 12 | 0 | 8 |
| 13 | 0 | 4 | 0 |
| 0 | 5 | 0 | 9 |
| 3 | 0 | 14 | 0 |
| 0 | 10 | 0 | 6 |
| 15 | 0 | 2 | 0 |
| 0 | 7 | 0 | 11 |

| | | | |
|---|---|---|---|
| 9 | 0 | 10 | 0 |
| 0 | 1 | 0 | 2 |
| 0 | 3 | 0 | 4 |
| 11 | 0 | 12 | 0 |
| 0 | 5 | 0 | 6 |
| 0 | 7 | 0 | 8 |

| | | | |
|---|---|---|---|
| 0 | 6 | 0 | 2 |
| 4 | 0 | 8 | 0 |
| 0 | 1 | 0 | 5 |
| 7 | 0 | 3 | 0 |

FIG. 7

| | B × 1 | | | | B × 2 | | | | |
|---|---|---|---|---|---|---|---|---|---|
| B F | 1 | 0 | 16 | 0 | 3 | 0 | 14 | 0 | B R |
| | 0 | 12 | 0 | 8 | 0 | 10 | 0 | 6 | |
| | 13 | 0 | 4 | 0 | 15 | 0 | 2 | 0 | |
| | 0 | 5 | 0 | 9 | 0 | 7 | 0 | 11 | |
| B R | 3 | 0 | 14 | 0 | 1 | 0 | 16 | 0 | B F |
| | 0 | 10 | 0 | 6 | 0 | 12 | 0 | 8 | |
| | 15 | 0 | 2 | 0 | 13 | 0 | 4 | 0 | |
| | 0 | 7 | 0 | 11 | 0 | 5 | 0 | 9 | |

FIG. 8

| B × 1 | | | | B × 2 | | | |
|---|---|---|---|---|---|---|---|
| 1 | 0 | 16 | 0 | 3 | 0 | 14 | 0 |
| 0 | 12 | 0 | 8 | 0 | 10 | 0 | 6 |
| 13 | 0 | 4 | 0 | 15 | 0 | 2 | 0 |
| 0 | 5 | 0 | 9 | 0 | 7 | 0 | 11 |
| 3 | 0 | 14 | 0 | 1 | 0 | 16 | 0 |
| 0 | 10 | 0 | 6 | 0 | 12 | 0 | 8 |
| 15 | 0 | 2 | 0 | 13 | 0 | 4 | 0 |
| 0 | 7 | 0 | 11 | 0 | 5 | 0 | 9 |
| 14 | 0 | 1 | 0 | 16 | 0 | 3 | 0 |
| 0 | 6 | 0 | 12 | 0 | 8 | 0 | 10 |
| 2 | 0 | 13 | 0 | 4 | 0 | 15 | 0 |
| 0 | 11 | 0 | 5 | 0 | 9 | 0 | 7 |
| 16 | 0 | 3 | 0 | 14 | 0 | 1 | 0 |
| 0 | 8 | 0 | 10 | 0 | 6 | 0 | 12 |
| 4 | 0 | 15 | 0 | 2 | 0 | 13 | 0 |
| 0 | 9 | 0 | 7 | 0 | 11 | 0 | 5 |

FIG. 9

| | CF | | CR | |
|---|---|---|---|---|
| C×1 | 9 | 0 | 10 | 0 |
| | 0 | 1 | 0 | 2 |
| | 0 | 5 | 0 | 6 |
| | 11 | 0 | 12 | 0 |
| | 0 | 3 | 0 | 4 |
| | 0 | 7 | 0 | 8 |
| C×2 | 10 | 0 | 9 | 0 |
| | 0 | 2 | 0 | 1 |
| | 0 | 6 | 0 | 5 |
| | 12 | 0 | 11 | 0 |
| | 0 | 4 | 0 | 3 |
| | 0 | 8 | 0 | 7 |
| | CR | | CF | |

FIG. 10

| | MF | | MR | |
|---|---|---|---|---|
| M×1 | 0 | 6 | 0 | 2 |
| | 4 | 0 | 8 | 0 |
| | 0 | 1 | 0 | 5 |
| | 7 | 0 | 3 | 0 |
| M×2 | 0 | 2 | 0 | 6 |
| | 8 | 0 | 4 | 0 |
| | 0 | 5 | 0 | 1 |
| | 3 | 0 | 7 | 0 |
| | MR | | MF | |

| B × 1 | | B × 2 | |
|---|---|---|---|
| X1 | X2 | X3 | X4 |
| X3 | X4 | X1 | X2 |
| X4 | X1 | X2 | X3 |
| X2 | X3 | X4 | X1 |

IMAGE FORMING METHOD

BACKGROUND OF THE INVENTION

1. Field of the Invention

The present invention relates to an image forming method, and more particularly to an image forming method which is effective in obtaining a recorded image of a high quality.

2. Description of the Related Art

Recently, a full color laser beam printer and a full color thermal transfer printer are rapidly coming into widespread use as output terminals for a personal computer, a work station, and the like. In such a case, a required performance is to output data of characters, a line drawing, and an image. Namely, a multi-gradation output is requested.

As an apparatus of this kind, known is an apparatus disclosed in, for example, JP-A-9-1866.

The disclosed apparatus is basically a thermal transfer printer and relates to one kind of pseudo area gradation technique using the multi-level dither method in which gradation is expressed in each of unit blocks each configured by a plurality of dots. The input/output characteristics corresponding to the position of a pixel in each unit block which is divided by block dividing means are made different among each of the unit blocks, the density level of an image data is converted to that for recording a dot, and positions where dots of the same size are recorded are changed among the unit blocks to be dispersed, so that the regularities of the size and arrangement of recording dots are reduced as much as possible. According to this configuration, generation of moire can be reduced in number while not making the image structure visually conspicuous.

In the pseudo area gradation technique using the dither method including the conventional image forming method, the characteristics of the gradation conversion table are so monotonous that unit blocks of the same pattern are usually used for the same color. In the case where misregistration of even a small degree occurs in locating of a recording position of each color, therefore, color misalignment is produced. When the size of a unit block is increased, the degree of such color misalignment can be relatively reduced, and hence the misalignment can be made inconspicuous. However, this causes a problem in that the unit block itself becomes conspicuous. By contrast, when the size of a unit block is reduced, there arises a problem in that color misalignment is conspicuous.

It is an object of the invention to solve the problems. It is another object of the invention to provide an image forming method which, even when misregistration occurs in locating of a recording position of each color, can make color misalignment inconspicuous, and hence is effective in obtaining a recorded image of a high quality.

SUMMARY OF THE INVENTION

The image forming method of the invention is a method in which gradation is expressed in each of unit blocks each configured by a plurality of dots, on the basis of an input color image data, wherein recording is performed while, for one color, unit blocks which are adjacent to each other in a main scanning direction of image recording are provided with gradation characteristics in different matrix arrangements in which front and rear portions are replaced with each other, the front and rear portions being obtained by division at an intermediate position in a sub-scanning direction.

Specifically, the invention provides an image forming method in which, for each of colors of C, M, Y, and BK, gradation is expressed in each of unit blocks each configured by one set of a predetermined number of dots. In the method, unit blocks for one color which are adjacent to each other in the main scanning direction have different matrix arrangements in which front and rear portions that are obtained by division at an intermediate position in the sub-scanning direction are replaced with each other. For each of the other colors, gradation characteristics are provided while a given matrix arrangement is set in the unit block given to the color. The image recording is performed by overlapping the colors.

That is, for a certain color, adjacent unit blocks are respectively subjected to gradation expression by matrices having related but different arrangements. For each of the other colors, gradation recording is performed in a matrix arrangement inherent in the color. As a result, the same misalignment is not continuously produced, so that, even when misregistration occurs in locating of a recording position of each color, color misalignment can be made inconspicuous.

The image forming method of the invention is a method in which gradation is expressed in each of unit blocks each configured by a plurality of dots, on the basis of an input color image data, wherein image formation is performed while, for black, unit blocks which are adjacent to each other in a main scanning direction of image recording are provided with gradation characteristics in different matrix arrangements in which front and rear portions are replaced with each other, the front and rear portions being obtained by division at an intermediate position in a sub-scanning direction, and in a pattern arrangement in which blocks that are adjacent to each other in the sub-scanning direction are shifted by one half of one block in the main scanning direction, and for other colors, unit blocks which are adjacent to each other in the sub-scanning direction of image recording are provided with gradation characteristics in different matrix arrangements in which front and rear portions are replaced with each other, the front and rear portions being obtained by division at an intermediate position in the main scanning direction.

In this configuration of the invention, the manner of providing a matrix is different from that in the configuration described above. The color is not arbitrarily selected, but black is specified as the color. For black, unit blocks which are adjacent to each other in the main scanning direction are provided with different matrix arrangements in which front and rear portions that are obtained by division at an intermediate position in the sub-scanning direction are replaced with each other, and blocks which are adjacent to each other in the sub-scanning direction are provided with pattern arrangements which are relatively shifted by one half of one block in the main scanning direction. For the other colors, matrix arrangement is not provided in a simple manner. That is, unit blocks which are adjacent to each other in the sub-scanning direction of image recording are provided with different matrix arrangements in which front and rear portions that are obtained by division at an intermediate position in the main scanning direction are replaced with each other.

In each of the above-described configurations, it is possible to obtain an image forming method in which each dot in the unit blocks is recorded at a size corresponding to given gradation. As a typical apparatus in which gradation is expressed by the size of each dot, known is a thermal transfer printer. In a thermal transfer printer, image formation is performed in the following manner. With respect to each of unit blocks, a matrix of 8×4, 6×4, 4×4, or the like is given to the dot arrangement, and the dots are ranked in the degree of magnification of the diameter. For each gradation level of the unit blocks, a conversion table is prepared for determining a dot which is to be recorded at the maximum diameter, and a dot the diameter of which is restricted to an intermediate one.

BRIEF DESCRIPTION OF THE DRAWINGS

FIG. 4 is a view showing a matrix for a printing color BK and used in the embodiment of the invention;

FIG. 5 is a view showing a matrix for a printing color C and used in the embodiment of the invention;

FIG. 6 is a view showing a matrix for a printing color M and used in the embodiment of the invention;

FIG. 7 is a view showing matrix arrangements B1 and B2 corresponding to two adjacent unit blocks for the printing color BK in a first embodiment of the invention;

FIG. 8 is a view showing a matrix arrangement for the printing color BK in a second embodiment of the invention;

FIG. 9 is a view showing a matrix arrangement for the printing color C in the second embodiment of the invention;

FIG. 10 is a view showing a matrix arrangement for the printing color M in the second embodiment of the invention; and FIG. 11 is a view showing a matrix X showing the matrix of FIG. 8 with setting 4 dots in vertical (sub-scanning direction)×2 dots in lateral (main scanning direction) as one unit element X1.

DESCRIPTION OF THE PREFERRED EMBODIMENTS

Hereinafter, an embodiment of the invention will be described with reference to the accompanying drawings.

Although a thermal transfer printer is used as an image forming apparatus to which the embodiment is applied, it is possible to use an apparatus of any kind as far as gradation can be given to each dot.

In the image forming method of the embodiment, density data of the three primary colors which are usually used for printing, C (cyan), M (magenta), and Y (yellow), and BK (black) are supplied from digital data outputting means which is not shown.

In the embodiment, the resolution in the main scanning direction is set to 600 dpi, and those in the sub-scanning direction are set to 1,200 dpi for BK, 900 dpi for C, and 600 dpi for M. Namely, the resolution is set at the ratio of 4:3:2 in the sub-scanning direction. Therefore, the element number size in a unit block for recording of each color is set in the same area, namely, 8 dots in vertical×4 dots in lateral (BK), 6 dots in vertical×4 dots in lateral (C), and 4 dots in vertical×4 dots in lateral (M). It is a matter of course that other resolutions and element number sizes may be set or the same resolution and the same element number size may be set. From the viewpoint of prevention of moire and the like, setting in which the resolution and the value of the element number size are changed in accordance with the color is usually conducted.

In the embodiment, in order to attain finer gradation expression, conversion from 256 levels to 1,024 levels is performed for gradation of a unit block for each of the colors, C, M, Y, and BK.

A given matrix is applied to a unit block as described later. A number that is representative of gradation is predetermined at each of intersections. A graph of gradation conversion characteristics showing relationships between gradation of an input image and the width (time) of a recording pulse defining the size of a recording dot is given to each of the addressed numbers.

Figure 1:
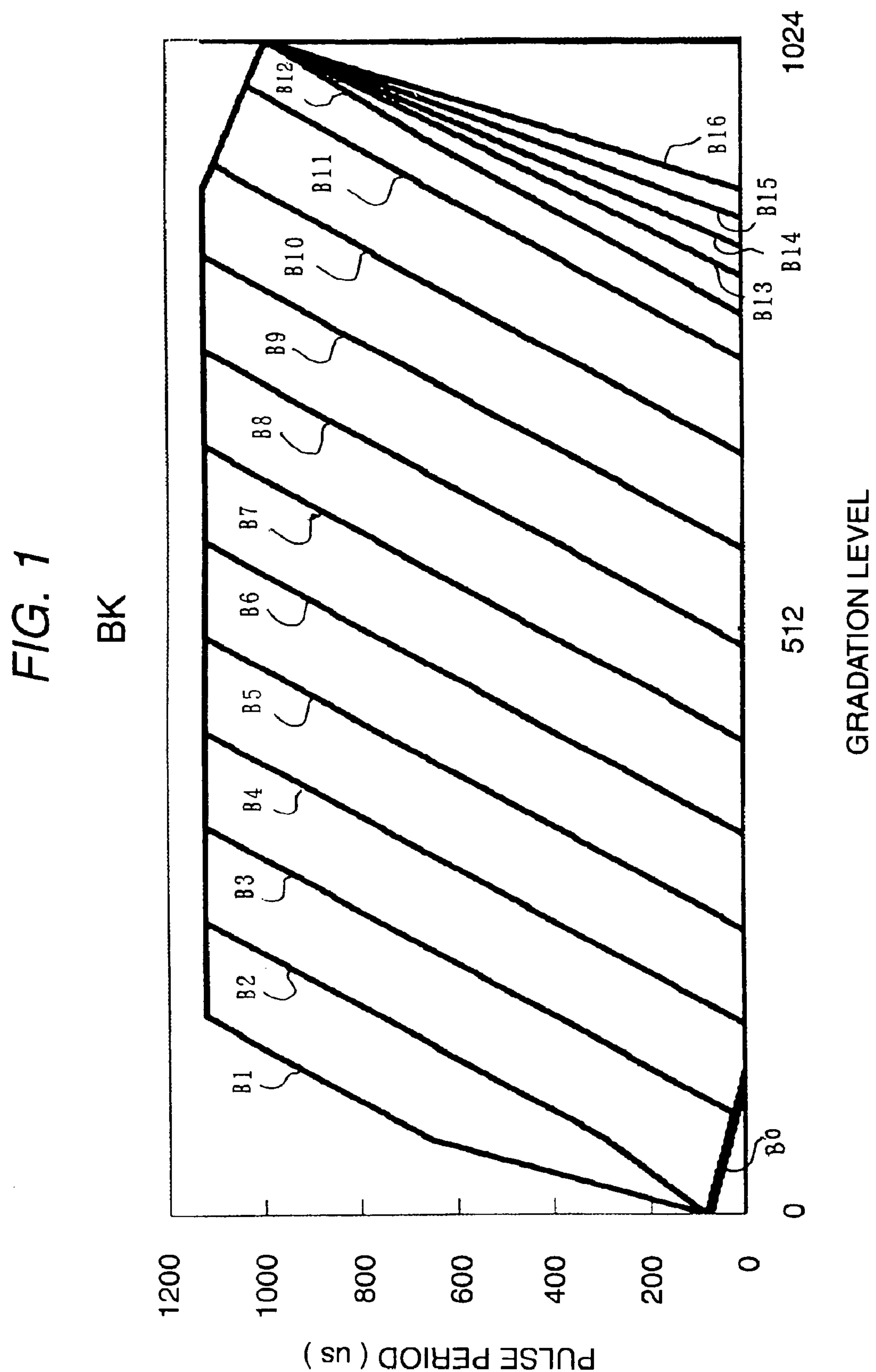
FIG. 1 is a view showing conversion characteristics (BK) on which a gradation conversion table used in an embodiment of the invention is based.
Figure 2:
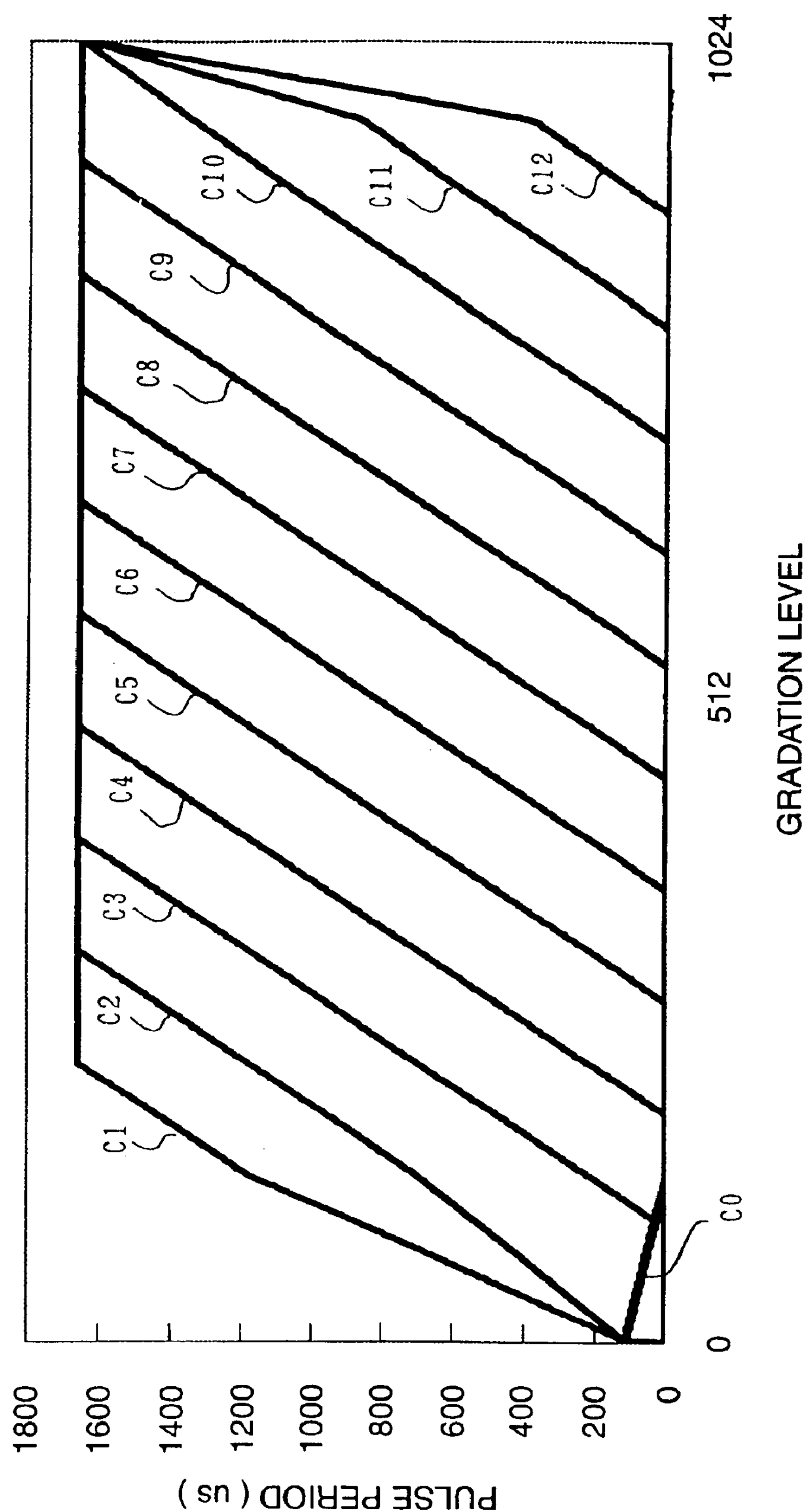
FIG. 2 is a view showing conversion characteristics (C) on which the gradation conversion table used in the embodiment of the invention is based.
Figure 3:
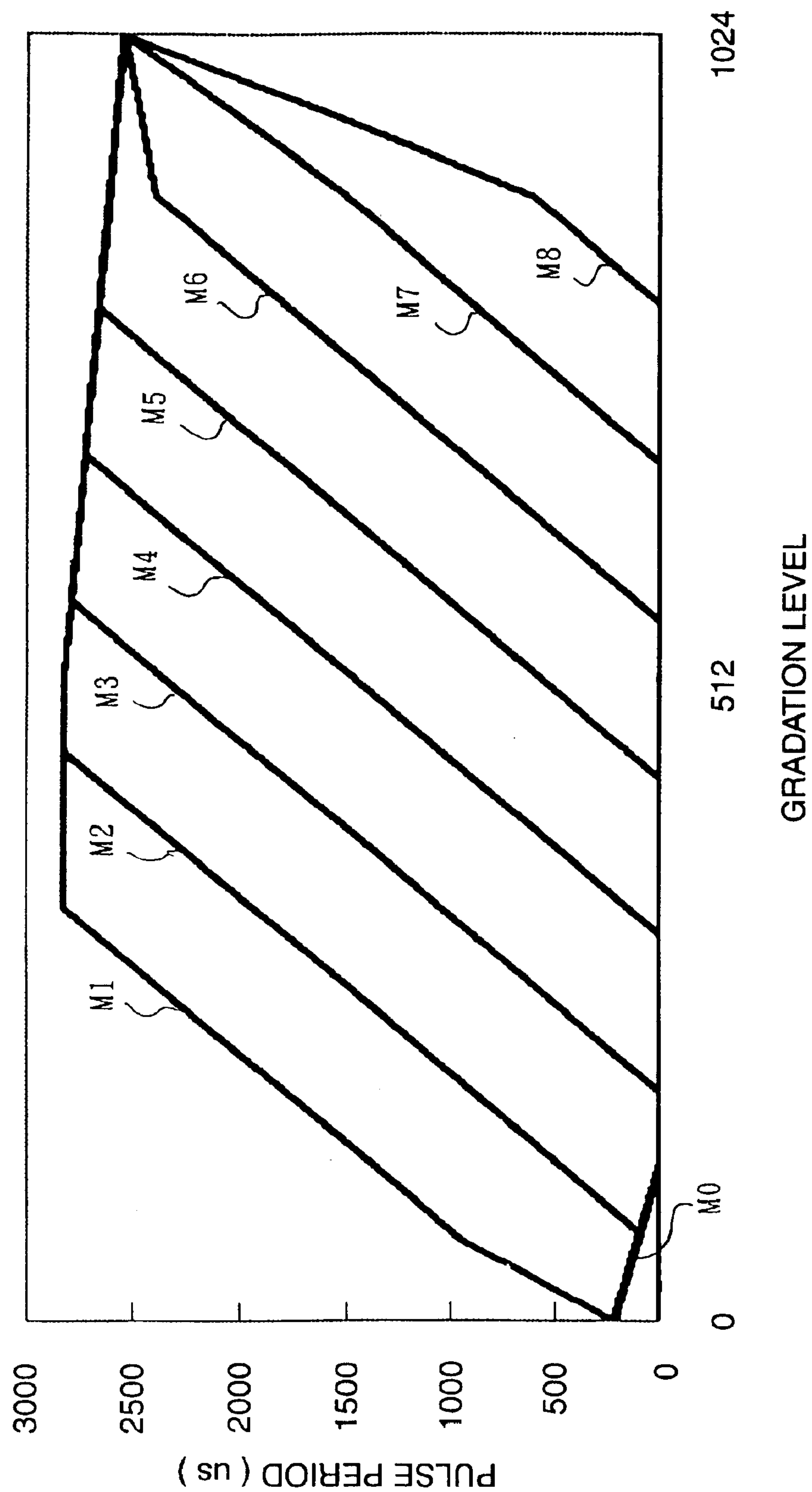
FIG. 3 is a view showing conversion characteristics (M) on which the gradation conversion table used in the embodiment of the invention is based.

FIGS. 1 to 3 show examples of such gradation conversion characteristics. FIG. 1 shows gradation conversion characteristics for BK, FIG. 2 for those of C, and FIG. 3 for those of M.

In FIGS. 1 to 3, the abscissas indicate gradations which are set in each unit block of an input image, and the ordinates indicate the widths (time) of a recording pulse corresponding to the sizes of the recording dots. As described above, gradations of an input image has 1,024 levels in the range from 0 to 1,023.

In the gradation conversion characteristic curves shown in FIGS. 1 to 3, characteristic curves showing relationships between the gradation level allocated to each unit block on the basis of the input image data and the energy for producing a recording dot are set to 17 lines respectively designated by B0 to B16, 13 lines respectively designated by C0 to C12 in FIG. 2, and 9 lines respectively designated by M0 to M8 in FIG. 3. Each of the lines (gradation conversion characteristic curves) indicates a gradation conversion characteristic curve in a growing process in which the diameter of a recording dot is gradually increased from the occurrence threshold (the lowest portion of the line).

When the gradation level of each unit block which is calculated from the image data as described above is applied to the graphs of FIGS. 1 to 3, therefore, recording pulse widths are known from the values of the ordinate corresponding to the positions where the gradation level intersect with the lines. Each of the recording pulse widths is used as the recording pulse width of a dot corresponding to the intersection designated by the number of the line. Namely, gradation is expressed by the size of each dot.

Figures 4, 5, 6:
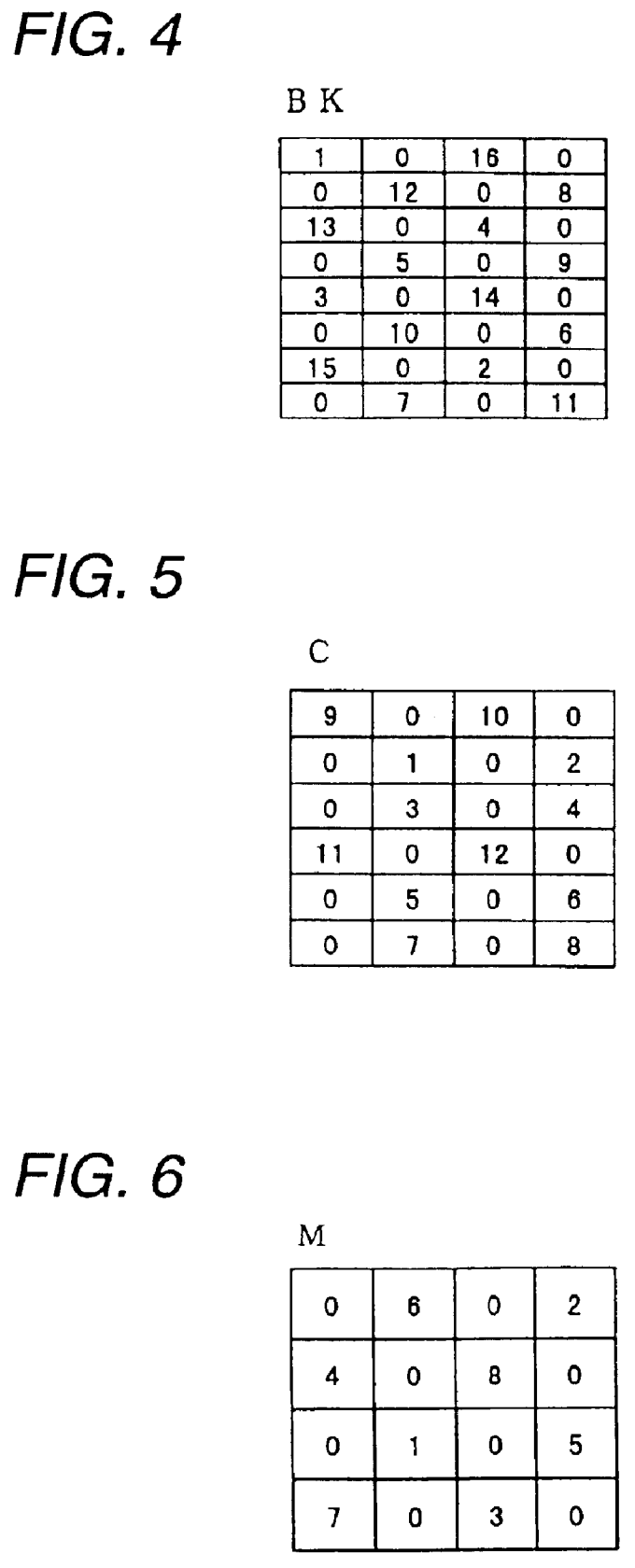

FIGS. 4 to 6 show given matrices showing the gradation conversion characteristic curves which are to be respectively applied to dots of a unit block of each color in the embodiment of the invention. FIG. 4 shows a matrix for BK, FIG. 5 shows that for C, and FIG. 6 shows that for M and Y.

As described above, the matrices are respectively configured by unit blocks which have the same vertical and lateral lengths, but which are different in the number of dots in the sub-scanning direction depending on the resolution of the sub-scanning direction. Gradation conversion is performed in accordance with the gradation conversion characteristic curve designated by the number which is decided by relative positional relationships in each block. Thereafter, different pulse widths are respectively allocated to the gradation levels so as to determine the energy which is to be applied to the respective printing points in the unit block.

In the matrix, the element value "0" indicates a printing point to which substantially no energy is applied in any gradation. The values "1", "2", "3", . . . in FIG. 4 indicate printing points corresponding to the characteristic curves "B1", "B2", "B3", . . . of FIG. 1, "1", "2", "3", . . . in FIG.

5 indicate printing points corresponding to the characteristic curves "C1", "C2", "C3", . . . of FIG. 2, and "1", "2", "3", . . . in FIG. 6 indicate printing points corresponding to the characteristic curves "M1", "M2", "M3", . . . of FIG. 3, respectively. In the color matrices, as described above, the resolution in the main scanning direction is 600 dpi, and that in the sub-scanning direction is 1,200 dpi for BK, 900 dpi for C, and 600 dpi for M. The element number size is set to 8 dots in vertical×4 dots in lateral (BK), 6 dots in vertical×4 dots in lateral (C), and 4 dots in vertical×4 dots in lateral (M). For example, the matrix BK will be considered. When unit blocks are configured so as to be 150 blocks/inch, 32 printing points of 8 dots in vertical×4 dots in lateral exist in one unit block because the resolution in the sub-scanning direction is 1,200 dpi. The gradation conversion characteristics of 17 kinds are allocated to the 32 printing points. The allocation is performed uniquely for the matrices BK, C, and M, and randomly for the matrix Y.

In the image forming method of the first embodiment of the invention, a desired arrangement operation is performed on the matrices of the colors.

FIG. 7 shows the matrix arrangements BX1 and BX2 corresponding to two adjacent unit blocks, being arranged in the main scanning direction, for a certain color (BK in this embodiment). In the figure, two unit blocks which are adjacent to each other in the main scanning direction of image recording are respectively configured. In this arrangement, a predetermined one of the matrices or the matrix BX1 is divided at an intermediate position in the sub-scanning direction, and the divided front and rear portions that are switched with each other are applied in the adjacent unit block BX2.

For the printing color BK, as described above, the element number size of a unit block is set to 8 dots in vertical (sub-scanning direction)×4 dots in lateral (main scanning direction). In the matrix BX1 corresponding to this color, the 8 dots in vertical (sub-scanning direction) are divided into two portions of 4 dots, and a modified matrix is set by switching the front portion BF and the rear portion BR in the sub-scanning direction with each other. Thereafter, image recording to form the whole image is performed in such a way that gradation conversion are alternatively performed for the blocks arranged in the main scanning direction by the given matrix BX1 without switching the front and rear portions in the sub-scanning direction and the modified matrix BX2 with switching them.

For the other colors, gradation conversion characteristics are set in the unit blocks given to the colors in the following manner. For the printing colors C and M shown in FIGS. 5 and 6, the gradation conversion characteristics of the given matrices C and M are set, and, for the color Y, gradation conversion characteristics of a matrix arrangement which is randomly set by elements of the values of the matrix M and other than "0" are set. The image recording is then performed by overlapping those colors.

In other words, for a certain color, adjacent unit blocks are subjected to image recording with using a given matrix and a modified matrix in a gradation expression, which are related in the matrix arrangement but with different internal configurations. Gradation image recording for the other colors is performed in the matrix arrangements such as shown in FIGS. 5 and 6. When these colors are overlapped and recorded, due to the presence of the modified matrix, the same misalignment being continuously produced can be prevented. As a result, even when misregistration occurs in locating of a recording position of each color, color misalignment can be made inconspicuous.

In the image forming method of a second embodiment of the invention, a desired arrangement operation is performed not only on the matrix of one color as described above, but on the matrices of all the colors.

FIGS. 8 to 10 are views showing changes of matrix arrangements for the colors BK, C, and M, respectively.

In FIG. 8, for the printing color BK, in the same manner as the first embodiment, unit blocks which are adjacent to each other in the main scanning direction of image recording are respectively configured by matrices of different arrangements in which a predetermined one of the matrices or the matrix BX1 is divided at an intermediate position in the sub-scanning direction, and front and rear portions are switched with each other. Furthermore, for the blocks which are adjacent to each other in the sub-scanning direction, gradation conversion characteristics of a pattern arrangement shifting one half of one block in the main scanning direction is applied.

For the printing color BK, as described above, the element number size of the matrix BX1 of a unit block is set to 8 dots in vertical (sub-scanning direction)×4 dots in lateral (main scanning direction). The 8 dots in vertical (sub-scanning direction) are divided into two portions of 4 dots, and a modified matrix BX2 is set by switching the front and rear portions in the sub-scanning direction with each other. Thereafter, the blocks that are arranged in the main scanning direction are alternatively subjected to the image recording with gradation conversion characteristics which are set by the given matrix BX1 without switching the front and rear portions in the sub-scanning direction, and the modified matrix BX2 with switching them. In this way, image recording is performed for the row-alignment blocks in the main scanning direction. The above process is identical with that of the first embodiment. In this embodiment, the gradation conversion characteristics of such image recording are further concerned not only from a series of matrices in the main scanning direction but also from a series of matrices in the sub-scanning direction. After the above mentioned image recording, the next image recording is performed for each unit block, which is adjacent by one block in the sub-scanning direction, in such a way that a series of matrices are shifted by one half of one block (in this case, two dots) in the main scanning direction with respect to the row-alignment blocks that is adjacent in the sub-scanning direction. Namely, blocks which are adjacent in the sub-scanning direction are matrices which are relatively shifted by one half of one block (two dots) in the main scanning direction.

This matrix arrangement will be described in more details. FIG. 8 shows four unit blocks or the element number of 16 dots in vertical (sub-scanning direction)×8 dots in lateral (main scanning direction). FIG. 11 shows the matrix of FIG. 8 in the form of a matrix X in which one unit element X1 is configured by 4 dots in vertical (sub-scanning direction)×2 dots in lateral (main scanning direction). Therefore, the given matrix BX1 corresponds to the matrix expressed by unit elements X1, X2, X3, and X4. As a result of such conversion, the four unit blocks included in the matrix X have four states of which the internal configurations of the unit elements X1, X2, X3, and X4 for each block are not the same ase that of each another block, respectively.

The whole image is recorded while gradation conversion characteristics are set for the printing color BK by using such a matrix.

For the other colors, the matrix arrangement is not provided in a simple manner. That is, unit blocks that are adjacent to each other in the sub-scanning direction of image recording are provided with different matrix arrangements in which the front and rear portions are obtained by dividing a given matrix at an intermediate position in the main scanning direction and are switched with each other.

FIG. 9 shows matrix arrangements CX1 and CX2 for the printing color C, or matrix arrangements of different arrangements in which, with respect to unit blocks which are adjacent in the sub-scanning direction of image recording, a given one or the matrix CX1 is divided at an intermediate position in the main scanning direction, and the front portion CF and the rear portion CR are switched with each other as a modulated matrix CX2.

Specifically, the element number size of the matrix CX1 of a unit block is set to 6 dots in vertical (sub-scanning direction)×4 dots in lateral (main scanning direction). The 4 dots in lateral (main scanning direction) are divided into two portions of 2 dots, and a modified matrix CX2 is set by switching the two portion CF and CR in the main scanning direction with each other. Thereafter, the blocks that are arranged in the main scanning direction are alternatively subjected to the image recording with gradation conversion characteristics which are set by the given matrix BX1 without switching the front and rear portions in the sub-scanning direction, and the modified matrix BX2 with switching them. Thereafter, the image of the printing color C is formed by applying the different block arrangements in the main-scanning direction, such as gradation conversion characteristics of the given matrix CX1 without switching the front and rear portions in the main scanning direction and the gradation conversion characteristics of the modified matrix CX2 with switching them.

FIG. 10 shows the matrix arrangement for the printing color M. In the same manner as the printing color C, a matrix arrangement is obtained in which, with respect to unit blocks which are adjacent in the sub-scanning direction of image recording, the matrix MX1 is divided at an intermediate position in the main scanning direction, and the front portion MF and the rear portion MR in the adjacent blocks are switched with each other. The process of setting matrices in image recording is performed in the same manner as the printing color C except that the element number size of the matrix MX1 of a unit block is set to 4 dots in vertical (sub-scanning direction)×4 dots in lateral (main scanning direction).

For the color Y, the whole image is formed with a matrix arrangement in which the element number size (4 dots in vertical×4 dots in lateral) and the resolution (600 dpi in the main scanning direction, 600 dpi in the sub-scanning direction) are identical with those for the printing color M and elements of values other than "0" are randomly set.

As described above, for black, as in the case of the matrix shown in FIG. 8, adjacent unit blocks are subjected to image recording while a given matrix and a modified matrix which are related in matrix arrangement but have different arrangements are alternatively used in gradation expression, and, for the block that are adjacent in the sub-scanning direction, gradation conversion characteristics of pattern arrangements which are relatively shifted by one half of one block in the main scanning direction are applied. For the other colors, as shown in FIGS. 9 and 10, with respect to unit blocks which are adjacent in the sub-scanning direction of image recording, gradation recording for the whole is performed in different matrix arrangements in which a predetermined matrix is divided at an intermediate position in the main scanning direction, and front and rear portions are switched with each other. When images of these colors are overlapped and recorded, modification due to the given matrices prevents the same misalignment from being continuously produced. As a result, even when misregistration occurs in locating of a recording position of each color, color misalignment can be made inconspicuous.

What is claimed is:

1. An image forming method for expressing gradations in each of unit blocks, being configured by a plurality of dots, on a basis of an input color image data, wherein an image recording for one color is performed in such a way that unit blocks which are adjacent to each other in a main scanning direction of the image recording are provided with gradation characteristics in different matrix arrangements by switching a front portion and a rear portion which are divided at an intermediate position in a sub-scanning direction.

2. An image forming method according to claim 1, wherein each dot in the unit blocks is recorded at a size corresponding to given gradation.

3. An image forming method according to claim 1, wherein the matrix arrangements are configured by unit blocks having same vertical and lateral lengths, but different numbers of dots in the sub-scanning direction, depending on a resolution of the sub-scanning direction.

4. An image forming method according to claim 1, wherein resolution in the main scanning direction is 600 dpi and in the sub-scanning direction is 1200 dpi for black, 900 dpi for cyan, and 600 dpi for magenta and yellow.

5. An image forming method according to claim 1, wherein the front portion and the rear portion are switched by interchanging matrix data with each other.

6. An image forming method for expressing gradations in each of unit blocks, being configured by a plurality of dots, on a basis of an input color image data, wherein an image recording for one color is performed in such a way that unit blocks which are adjacent to each other in a main scanning direction of the image recording are provided with gradation characteristics in different matrix arrangements by switching a first front portion and a first rear portion which are divided at an intermediate position in a sub-scanning direction in a matrix, while in an arrangement of unit blocks which are adjacent to each other in the sub-scanning direction are shifted by one half of one block of the matrix in the main scanning direction, and for other colors, unit blocks which are adjacent to each other in the sub-scanning direction of image recording are provided with gradation characteristics in different matrix arrangements by switching a second front portion and a second rear portion which are divided at an intermediate position in a main scanning direction in the matrix.

7. An image forming method according to claim 6, wherein each dot in the unit blocks is a recording dot having a size defined by a given gradation which is set as a part of a corresponding unit block on the basis of the color image data.

8. An image forming method according to claim 6, wherein said one color is black color.

9. An image forming method according to claim 6, wherein the matrix arrangements are configured by unit blocks having same vertical and lateral lengths, but different numbers of dots in the sub-scanning direction, depending on a resolution of the sub-scanning direction.

10. An image forming method according to claim 6, wherein resolution in the main scanning direction is 600 dpi and in the sub-scanning direction is 1200 dpi for black, 900 dpi for cyan, and 600 dpi for magenta and yellow.

11. An image forming method according to claim 6, wherein the front portion and the rear portion are switched by interchanging matrix data with each other.

12. An image forming method for expressing gradations in each of unit blocks, being configured by a plurality of dots, on a basis of an input color image data, wherein an image recording for color is performed in such a way that unit blocks which are immediately adjacent to each other in a scanning direction of the image recording are provided with gradation characteristics in different matrix arrangements by switching a front portion and a rear portion of the adjacent matrices, said front and rear portions being less than a full unit block of data.

13. An image forming method according to claim 12, wherein the front portion and the rear portion are switched by interchanging matrix data with each other.

14. An image forming method for expressing gradations in each of unit blocks, being configured by a plurality of dots, on a basis of an input color image data, wherein an image recording for one color is performed in such a way that unit blocks which are immediately adjacent to each other in a first scanning direction of the image recording are provided with gradation characteristics in different matrix arrangements by switching a first front portion and a first rear portion of the adjacent matrices, said first front and first rear portions being less than a full unit block of data, while in an arrangement of unit blocks which are immediately adjacent to each other in a second scanning direction of the image recording the adjacent matrices are shifted by one half of one unit block of the matrix in the first scanning direction, and for other colors, adjacent unit blocks are provided with gradation characteristics in different matrix arrangements by switching a second front portion and a second rear portion of the adjacent matrices, said second front and second rear portions being less than a full unit block of data.

15. An image forming method according to claim 14, wherein the first front portion and the first rear portion are switched by interchanging matrix data with each other and the second front portion and the second rear portion are switched by interchanging matrix data with each other.

* * * * *